United States Patent
Waas-Russiyan et al.

[11] Patent Number: 6,086,965
[45] Date of Patent: Jul. 11, 2000

[54] AWARD MEDAL AND PROCESS FOR MAKING SAME

[76] Inventors: Cinthia Waas-Russiyan; Nicholas Russiyan, both of P.O. Box 394, Sugar Loaf, N.Y. 10981

[21] Appl. No.: 09/153,685

[22] Filed: Sep. 15, 1998

Related U.S. Application Data

[60] Provisional application No. 60/059,187, Sep. 17, 1998.
[51] Int. Cl.[7] .................................................. A47G 1/12
[52] U.S. Cl. ......................... 428/13; 428/66.5; 428/66.6; 428/542.4; 63/20; 40/1.5
[58] Field of Search .................. 428/13, 15, 66.5, 428/542.4, 66.6; 63/20; 40/1.5

[56] References Cited

U.S. PATENT DOCUMENTS

| | | |
|---|---|---|
| 2,244,565 | 6/1941 | Nast . |
| 2,451,913 | 10/1948 | Brice . |
| 2,931,119 | 4/1960 | Gits et al. . |
| 3,075,249 | 1/1963 | Sucher . |
| 3,114,597 | 12/1963 | Lee . |
| 3,246,066 | 4/1966 | Gits . |
| 3,312,197 | 4/1967 | Smith . |
| 3,654,062 | 4/1972 | Loew . |
| 3,659,327 | 5/1972 | Beverick et al. ...................... 428/15 X |
| 3,660,211 | 5/1972 | Brody . |
| 3,968,582 | 7/1976 | Jones ................................... 428/66.5 X |
| 4,067,947 | 1/1978 | Miori . |
| 4,604,819 | 8/1986 | Grey . |
| 4,767,647 | 8/1988 | Bree ....................................... 428/31 X |
| 5,067,265 | 11/1991 | Harms . |

*Primary Examiner*—Timothy Speer
*Assistant Examiner*—Bryant Young
*Attorney, Agent, or Firm*—Malloy & Malloy, P.A.

[57] ABSTRACT

An improved award medal capable of being configured to include bright attractive colors and any number of unique and/or intricate designs. The award medal of the present invention is structured to be formed of a relatively soft material which includes a weight element so as to substantially duplicate the weight of a conventional metallic award medal. The improved award medal includes a main body preferably formed to have a generally flat, plate-like configuration and appearance, with a first outer surface, a second outer surface, and a surrounding peripheral sidewall. The main body will be formed of a substantially soft, resilient, rubber material and ideally, a rubberized polyvinyl chloride material. In order to provide structural integrity to the main body, a substantially heavy weight assembly is disposed within the improved award medal. Additionally, a variety of decorative indicia are positioned on at least one of the outer surfaces of the main body. The decorative indicia are disposed and configured on the outer surface so as to provide a three dimensional texture and appearance to the improved award medal. The present invention additionally includes a method for manufacturing such an improved award medal.

9 Claims, 2 Drawing Sheets

AWARD MEDAL AND PROCESS FOR MAKING SAME

CLAIM OF PRIORITY

The present application is based on and a claim to priority under 35 U.S.C. Section 119(e) is made to the provisional patent application filed with the U.S. Patent Office on Sep. 17, 1998 and assigned Ser. No. 60/059,187, which is incorporated herein by reference.

BACKGROUND OF THE INVENTION

1. Field of the Invention

The present invention is directed towards an improved award medal formed of a relatively soft, resilient, rubberized material and including a weight element so as to offer an award medal which feels fairly heavy or at least substantial when worn by a recipient about his or her neck. The award medal of the present invention can be constructed to include attractive, brightly colored elements and ornamental designs and is particularly suitable for use by children. In addition, the present invention is directed towards a method of making the improved award medal described herein.

2. Description of the Related Art

It has become customary to distribute various types of certificates, awards, ribbons, and the like to commemorate achievement in particular fields such as sports, academics, business, charities, and community service, for example. A common type of achievement award medal is modeled after the well known Gold, Silver, and Bronze medals which are awarded at the Olympics and like prestigious sporting events. While some of these medals may indeed be formed out of a precious material, most of such conventional types of award medals generally consist of a disc-shaped plate, formed by either being casted or struck from a less expensive, heavy metallic material such as zinc, copper or brass, that is then plated in gold, silver, bronze or a variety of other metallic finishes so as to reduce the expense associated therewith. With many such conventional medals, the disc-shaped plate may be engraved with markings such as "first place", "second place", "runner up", and the like, and may include a ribbon necklace designed to fit around a user's neck. Such conventional metallic material medals have the advantage of being of sufficiently heavy weight to give the recipients a feeling of value, worth and prestige. Also, the relatively heavy weight of such conventional medals serves to facilitate a desired positioning and feel when worn by the recipient.

One drawback associated with conventional metallic award medals is that they often lack sufficiently decorative details or ornamental features, most likely due to the costs associated with casting or otherwise forming the medal to include such decorative features. This includes an inability to provide metallic medals with more than a uni-colored appearance, such as a colorful display that might otherwise be appealing to a wide variety of people including both adults and children. In short, conventional award medals are frequently only available in metallic colors such as silver, gold, and bronze and with such types of single color award medals, any decorative indicia which is displayed on the medal is simply not likely to stand out so as to create a memorable impression of achievement.

There is another drawback associated with conventional metallic award medals which relates to their unexpected use by children. In particular, although award medals are usually given to adults, it is becoming more and more common for award medals to be given to children at junior sporting events, science fairs, field days, scouting competitions, and the like. Unfortunately, however, given the playful nature of children, they may swing the award medal by the ribbon necklace portion and accidentally or even intentionally throw the entire award medal at another person or an object. This raises concern about the possibility of a resulting bodily injury from the heavy metallic, disc-shaped plate of the award medal. Even if no one is injured, however, it is seen that conventional award medals can easily do damage to objects such as surrounding furniture, windows, vehicles or like structures. As such, sponsors and organizers of children's events are often reluctant to provide such conventional award medals to children due to the potential for injury or damage. In order to avoid potential injuries and property damage, many people planning competitive events for children have turned to distributing certificates and ribbons in place of award medals. Unfortunately, however, such paper and ribbon awards are often not brought home in a condition suitable for framing or display. Additionally, of course, it is seen that a ribbon or a paper certificate is often not considered to commemorate a particularly noble achievement or to be as prestigious as a medal award.

In an effort to produce award medals having structural features which differ from conventional or metallic medals, others in the art have experimented with a variety of different types of construction. For example, an award medal has been produced which utilizes a metallic disc-shaped plate of zinc, copper, brass, or aluminum, made by being either cast or struck, and to which is added a hard or soft enamel coating afterwards so as give the award medal color. However, the limitations of applying enamel to metal are stringent. For instance, if more than one enamel color is to be used on such medals, each color must generally be separated from any other enamel color used on the award medal, typically by way of a metal divider, which can be tedious and somewhat expensive to achieve. Another limitation associated with such medals is that enamel color applied is essentially a paint that is baked on the surface of the medal, and thus, the resulting award medal has a flat and untextured appearance, unless the medal was formed during casting to have raised indicia thereon or three-dimensional appearance, which as has been described, adds to the expense of making the medal. Still, others in the art turned to utilizing a colored mylar paper or label that can be inserted within a holder or border formed of a hard acrylic or metal material, in an effort to add color highlights to award medals. Once again, this alternative has the disadvantage that the award medal is limited to the flat one-dimensional design which can be produced on the mylar paper, and importantly, is a substantially light weight and hence, less desirable type of an award. Yet others have attempted to provide award medals which are constructed of a plastic or hard acrylic material, yet such awards have limited color applications and little or no texture so that they do not offer a three dimensional appearance. Such plastic award medals are also typically very light in weight and have a cheap and inexpensive appearance. As such, these award medals are not able to provide the prestigious and substantially expensive look and feel of metallic award medals. Additionally, although plastic award medals are lighter then metallic medals, they may crack or otherwise be susceptible to breakage and thus, may not reduce the possibility of serious injury to children. These existing plastic award medals also fail to provide the structural combination of being soft, resilient, and flexible, while still having sufficient weight and structural integrity found in more conventional metallic award medals.

Accordingly, there is a need in the art for an improved award medal which may be formed of a relatively soft and resilient rubberized material so as to provide a safer and more appealing alternative to conventional award medals. Such an improved award medal should also be of sufficient weight and structural integrity to instill the perception of value and worth as well as facilitate the proper and desired positioning and feel when worn about the neck of a recipient. Any such improved award medal should be capable of demonstrating a number of distinct and highly desirable characteristics in a single medal structure which were not previously obtainable using known available structure and methods of manufacturing. Such characteristics include, but are not limited to: a multitude of colors a variety of textures, high relief dimension, fine detailing and a heavy weight, as set forth above.

SUMMARY OF THE INVENTION

The present invention is directed towards an improved award medal having a weight and structural integrity which is somewhat similar to that provided by conventional metallic award medals, but which is structured to be capable of including a variety of ornamental designs in attractive color combinations on exposed surfaces thereof. The award medal of the present invention is also structured to be formed from a relatively soft, resilient material thereby providing a safer alternative to conventional award medals.

The improved award medal of the present invention includes a main body formed preferably in a substantially flat, plate-like configuration and having a first, exposed outer surface, a second exposed outer surface, and a continuous peripheral portion which may be in the form of an outer rim or sidewall. The main body of the improved award medal will be formed of a substantially soft, resilient, and rubberized material. In order to provide a predetermined amount of weight and structural integrity, the main body is formed to include a substantially rigid weight assembly that is preferably disposed within and surrounded by the soft, rubberized material. Additionally, a variety of decorative indicia will be disposed on at least one of the outer surfaces of the main body to provide proper designation and information concerning the award and give the improved award medal an aesthetically pleasing appearance.

A primary object of the present invention is to provide a new and improved award medal which is formed primarily of a soft pliable material but which is constructed to still be sufficiently heavy so as to maintain the desired positioning and feel when worn about the neck or other location on the recipient.

Another primary object of the present invention is to provide an improved award medal which is primarily formed of a soft, resilient, rubberized material so as to be substantially safer in the event the award is thrown and so as to be relatively insusceptible from cracking and breakage.

Yet another primary object of the present invention is to provide an improved award medal which includes and greatly facilitates the inclusion of several bright colors and ornamental designs so as to be substantially more attractive and desirable to recipients than conventional award medals.

It is also an object of the present invention is to provide an improved award medal which is substantially rugged and durable and structured to withstand rough handling and use.

It is a further object of the present invention to provide an improved award medal which can be economically mass produced.

Yet another object of the present invention is to provide a method of economically manufacturing the improved award medal of the present invention.

These and other objects, features, and advantages of the present invention will become more readily apparent from the attached drawings and the detailed description of the preferred embodiments, which follow.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
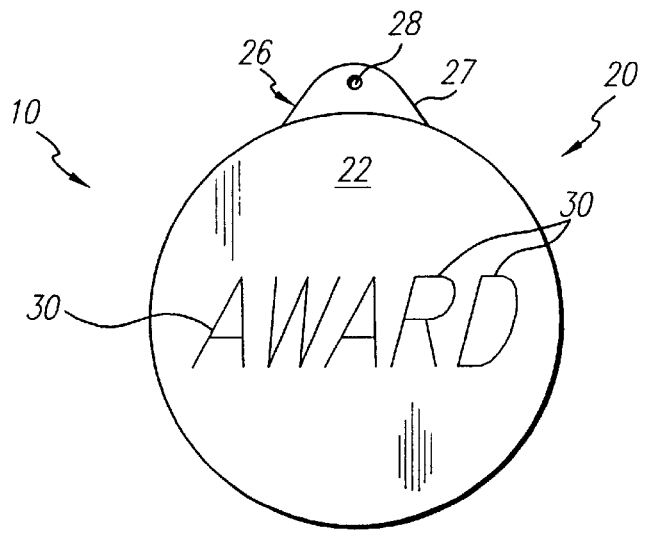
FIG. 1 is a front view of the improved award medal of the present invention.

Shown throughout the Figures, the present invention is directed towards an improved award medal generally indicated as 10. The improved award medal 10 of the present invention includes a main body 20 which is preferably formed to have a substantially if not completely flat, plate-like configuration. The improved award medal 10 is most preferably formed to have a circular configuration as shown in the Figures, although other shapes may also be utilized without departing from the spirit and intended scope of the present invention. The main body 20 of the improved award medal 10 includes a first, exposed outer surface 22, a second exposed outer surface 24, and a continuous peripheral portion which may be in the form of a surrounding sidewall 25. In the preferred embodiment, the main body 20 will be formed of a substantially soft, resilient material such as rubber or vinyl, although most preferably, a rubberized polyvinyl chloride or PVC material will be utilized. The substantially resilient, rubberized PVC material is structured to be and/or offers the advantage of being sufficiently soft so as to significantly reduce the possibility of injury or damage from an impact with the improved award medal, assuming it were thrown or dropped.

In one embodiment, the main body 20 can be formed to include a connecting structure generally indicated as 26 which, as shown, may be defined by an outwardly extending tab 27 having an aperture 28 extending therethrough. The purpose of such a connecting structure is to allow attachment of a ribbon, cord, chain, or like supporting element so that the award medal may be supported or hung around the neck of the recipient in the conventional fashion. Also, due to the unique rubberized material from which the main body, 20 and tab 27 are formed, the tab 27 can be cut off, if desired, so that the remainder of main body 20 can be used as a decorative emblem. Obviously, other connecting structures could be formed on or in the main body 20 to provide means to attach a ribbon or like supporting element, as set forth above.

Figure 2:
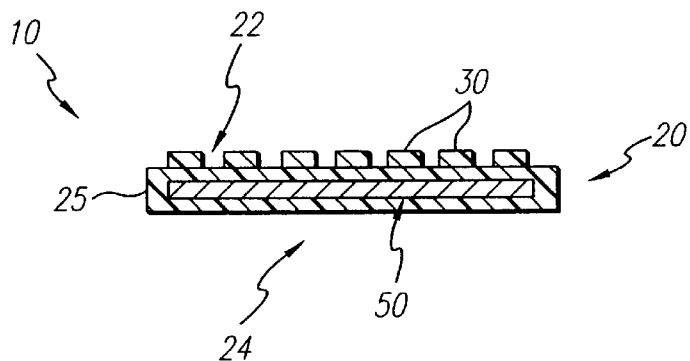
FIG. 2 is a cross-sectional side view of the improved award medal of the present invention.
Figure 3:
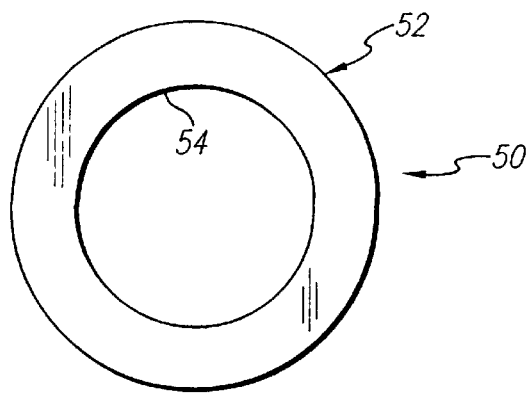
FIG. 3 is a front view of a preferred embodiment of the substantially heavy weighted element of the present invention.

The improved award medal 10 of the present invention additionally includes a weight assembly generally indicated as 50. The weight assembly 50 is disposed or positioned either on the main body 20 or preferably, within the main body 20, and ideally, so as to be encapsulated within the main body 20, as is best shown in FIG. 2 and as will be explained in greater detail with reference to FIG. 6 and 7. The weight assembly 50 will preferably be formed of a substantially rigid material such as a metallic material. As such, the weight assembly 50 will provide structural integrity to the main body 20 of the improved award medal 10. In the most preferred embodiment, as shown in FIG. 3, the weight assembly 50 comprises a one piece, annularly configured weight element 52 of metallic material. While other configurations may also be utilized without departing from the spirit and intended scope of the present invention, the annular configuration is thought to have certain distinct advantages. More specifically, making the weight element 52 to have an annular configuration and a central opening 54, is presently thought to help alleviate the heat retained in the weight element 52; by being formed of a metallic material it naturally will retain heat. With the preferred construction of the weight element 52 though, the chemical reaction of the metal of weight element 52 during the process to form main body 20 is currently believed by the inventors hereof to result in creating little or no bubbles or burns on the resulting main body 20.

Further, the weight element 52 is most preferably formed, sized and structured specifically to add sufficient weight to the main body 20 of the improved award medal 10 of the present invention. Preferably, the type and/or amount of material used to form weight element 52 is such as to substantially duplicate the weight of a conventional metallic award medal of similar size and configuration. The weight of the weight element 52, of course, may vary depending upon the size of the main body 20. However, the weight should be sufficient to maintain proper positioning of the main body 20 when the award medal 10 is worn about the neck of a recipient. In addition, the weight element 52 is preferably of a size which is smaller than that of the main body 20 so as to provide sufficient weight but also, limit the flexibility of the soft, rubberized material used to form the main body. This is particularly useful in larger award medals so that they are better able to retain their shape.

As shown in FIG. 3, the annular configuration of the weight element 52 is such as to include the substantially centrally disposed aperture 54. The overall size of the weight element 52 is dependent upon the relative size of the main body 20. The weight element 52 should be somewhat smaller, as illustrated in FIG. 2, than the main body 20 so as to be completely encapsulated on the interior thereof. However, when so positioned, as shown in FIG. 2, the central aperture 54 of the weight element in the most preferred embodiment should be substantially aligned with a center portion of the main body 20 after formation of the main body 20 is complete.

A variety of decorative indicia 30 are preferably positioned on the first outer surface 22 of the improved award medal 10 in order to properly designate the award as well as greatly enhance the appearance thereof. As best shown in FIGS. 1 and 2, the decorative indicia 30 may have a variety of configurations and may be formed to include a variety of different colors, as will be explained in greater detail with reference to FIG. 4. Furthermore, in the preferred embodiment, the decorative indicia 30 will be structured to be raised above the first outer surface 22 of the main body 20, as shown in FIG. 2, so as to provide a three dimensional texture and appearance to the improved award medal.

Figure 4:
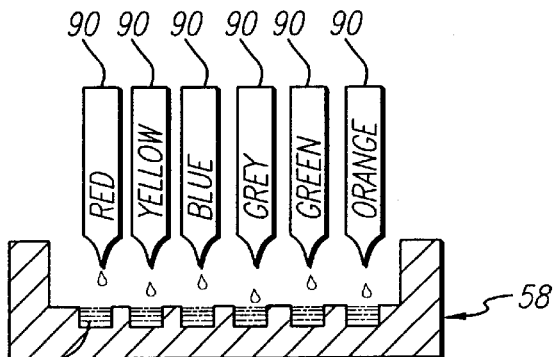
FIG. 4 is a cross-sectional side view of a mold used to form the present invention and showing the manufacturing step of injecting the decorative layer of soft, resilient, rubberized material into the mold.

Preferably, the improved award medal of the present invention is produced and manufactured by utilizing a formed mold 58 preferably of steel, as shown in FIGS. 4 through 7. As one of or as the preferred initial step, a decorative layer 60 of soft, resilient, rubberized material is injected, when in liquid form and preferably by hand, into the mold as shown in FIG. 4, in order to form the decorative indicia 30. As described herein, the decorative layer 60 will preferably be formed of a variety of bright, attractive colors so as to greatly enhance the attractiveness and versatility in appearance of the improved award medal 10. Once the design, texture and general format of the produced medal has been decided, the mold 58 has various cut out portions as at 63, formed by hand tooling or cutting or any other similar and/or efficient process. This pre-cutting of the mold serves to produce the overall configuration of the decorative layer 60, but also accomplishes the desired texture. The overall decorative appearance of the resulting medal is thereby enhanced. It should be emphasized herein that after each of the heating steps described in the method of forming the subject medal, sufficient heat should be utilized only to cure the rubber or PVC material to a minimal degree to accomplish the desired soft, resilient feel. The rubberized PVC material should not be overly heated to the point where it becomes hard as with the use of other materials such as plastics, resins or styrene. The rubberized PVC material utilized in the present invention should at all times, after heating and curing, preferably remain soft and substantially resilient.

Figure 5:
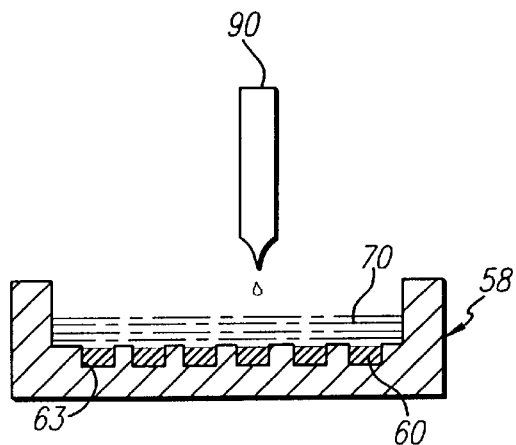
FIG. 5 is a cross-sectional side view of the mold shown in FIG. 4 and illustrating the manufacturing step of injecting a first background layer of soft, resilient, rubberized material onto the decorative layer.
Figure 6:
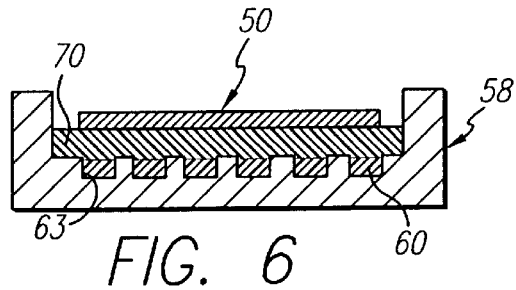
FIG. 6 is a cross-sectional side view of the mold shown in FIG. 4 and further showing the manufacturing step of placing the substantially heavy weighted element on the first background layer.
Figure 7:
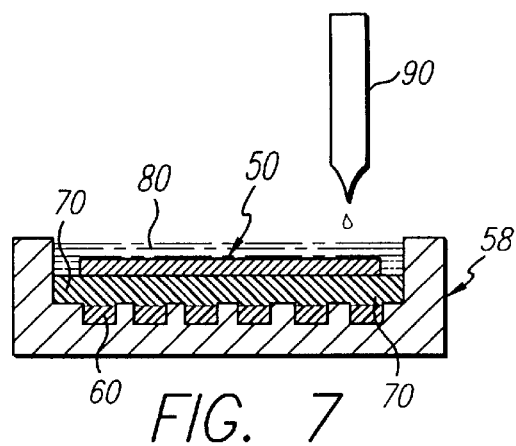
FIG. 7 is a cross-sectional side view of the mold shown in FIG. 4 and further showing the manufacturing step of injecting a second background layer of soft, resilient, rubberized material onto the substantially heavy weighted element.

After the decorative layer 60 of soft, resilient, rubberized material is injected into the mold, the mold is heated to a desired temperature range of between generally about 250 degrees celsius to 350 degrees celsius. Next, a first background layer 70 of soft, resilient, rubberized material is injected onto the decorative layer 60 after layer 60 as been cured, as shown in FIG. 5. After the first background layer 70 is injected into the mold, the entire mold is re-heated to the preferred temperature range of between generally about 250 degrees celsius to 350 degrees celsius. The weight member 52 is then placed on the first background layer 70, as shown in FIG. 6, and covered with a second background layer 80 so as to sandwich the weight element 52 between the first background layer 70 and the second background layer 80. The second background layer 80 is also preferably formed by hand injecting liquid PVC. As shown in FIGS. 4, 5 and 7, the instruments 90 may be hand-held injecting devices or other instruments capable of precisely injecting the liquid PVC material. After the injection step, the mold is re-heated to a temperature of between 250 degrees celsius and 350 degrees celsius. After the mold has cooled down, the improved award medal 10 will be completely ready and can be removed from the mold 58.

While the description of the method of the present invention is described by forming only three separate layers, 60, 70 and 80, it should be emphasized that the manufacturing of some medals may include the forming of less or even many more layers. This depends upon the complexity and overall design of the medal 10 as well as the color, texture, configuration, etc. of the body 22 and more specifically the indicia 30. Such additional layers may be necessary due to the provision of added surface cuts into surface of the mold 58. These surface cuts will create additional details such as, but not limited to, texture of glass, grass, textures of a ball, and textures of the individual detailed elements such as stippling on a ball or like portion of the outer exposed surface 22 of the body 20. It should further be noted that in practicing the method of manufacture of the present medal structure, the liquid PVC material is preferably injected by hand using hand-held injection instruments such as injection needles 90 to form the various layers which in turn conform to the many levels or surfaces (surface cuts) involved in the formation of the subject medal 10.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. An award medal comprising:
   a) a substantially unitary main body having a substantially flat configuration and including a first outer surface and a second outer surface oppositely disposed to one another, said main body formed of a soft, resilient, rubberized material,
   b) said main body further including a peripheral portion extending continuously between said first and second outer surfaces,
   c) decorative indicia formed on at least one of said first or second outer surfaces,
   d) a weight assembly permanently mounted in an encapsulated position on said main body in inwardly spaced relation to said first and second outer surfaces, and
   e) said weight assembly at least partially formed of a substantially rigid material so as to provide structural integrity to said main body.

2. An award medal as recited in claim 1 wherein said decorative indicia are integrally formed on and extend outwardly from at least one outer surface so as to provide a three-dimensional texture and appearance to said award medal.

3. An award medal as recited in claim 1 wherein said weight assembly comprises a weight element structured of a metallic material.

4. An award medal as recited in claim 1 wherein said weight assembly comprises a weight element comprising a substantially flat, annular configuration having a central aperture formed therein.

5. An award medal as recited in claim 1 further comprising a severable connecting structure having an aperture formed therein to facilitate support of said main body.

6. An award medal as recited in claim 1 wherein said decorative indicia are constructed of a colored soft, resilient, rubberized material.

7. An award medal as recited in claim 1 wherein said decorative indicia is formed on said first outer surface and disposed to extend outwardly therefrom to define a substantially three dimensional texture on said first outer surface, said second outer surface having a substantially flat configuration.

8. An award medal as recited in claim 3 wherein said central aperture of said weight element is substantially aligned with a center portion of said main body.

9. An award medal as recited in claim 1 wherein said soft, resilient, rubberized material is a rubberized polyvinyl chloride.

* * * * *